(12) United States Patent
Biazetti et al.

(10) Patent No.: US 7,925,528 B2
(45) Date of Patent: Apr. 12, 2011

(54) ESTIMATING AND SCHEDULING ADDITIONAL CALENDAR TIME IN PREPARATION FOR ELECTRONICALLY CALLED MEETINGS

(75) Inventors: Ana Claudia Biazetti, Cary, NC (US); Fonda J Daniels, Cary, NC (US); Eric Leonard Masselle, Raleigh, NC (US); Patrick Gabriel McGowan, Chapel Hill, NC (US); Christopher Joseph Paul, Durham, NC (US); Andrew Lewis Schirmer, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 1164 days.

(21) Appl. No.: 11/467,966

(22) Filed: Aug. 29, 2006

(65) Prior Publication Data
US 2008/0059265 A1    Mar. 6, 2008

(51) Int. Cl.
*G06F 9/46* (2006.01)
(52) U.S. Cl. .......................................... 705/9
(58) Field of Classification Search ........................ 705/9
See application file for complete search history.

(56) References Cited

U.S. PATENT DOCUMENTS

| | | | |
|---|---|---|---|
| 4,831,552 A | 5/1989 | Scully et al. | |
| 4,977,520 A * | 12/1990 | McGaughey et al. | 715/753 |
| 5,050,077 A | 9/1991 | Vincent | |
| 5,129,057 A | 7/1992 | Strope et al. | |
| 5,528,745 A | 6/1996 | King et al. | |
| 5,774,867 A | 6/1998 | Fitzpatrick et al. | |
| 5,899,979 A * | 5/1999 | Miller et al. | 705/9 |
| 6,047,260 A | 4/2000 | Levinson | |
| 6,101,480 A | 8/2000 | Conmy et al. | |
| 6,253,169 B1 * | 6/2001 | Apte et al. | 704/9 |
| 6,466,236 B1 | 10/2002 | Pivowar et al. | |
| 6,505,167 B1 * | 1/2003 | Horvitz et al. | 705/9 |
| 6,615,246 B2 | 9/2003 | Pivowar et al. | |
| 6,781,920 B2 | 8/2004 | Bates et al. | |
| 6,845,370 B2 | 1/2005 | Burkey et al. | |
| 6,988,128 B1 | 1/2006 | Alexander et al. | |
| 7,209,888 B2 | 4/2007 | Frid-Nielsen et al. | |
| 7,222,156 B2 * | 5/2007 | Gupta et al. | 709/206 |
| 7,283,970 B2 | 10/2007 | Cragun et al. | |
| 7,343,312 B2 | 3/2008 | Capek et al. | |
| 7,716,078 B2 * | 5/2010 | Bourne et al. | 705/9 |
| 2001/0014866 A1 | 8/2001 | Conmy et al. | |
| 2003/0018724 A1 | 1/2003 | Mathewson, II et al. | |
| 2003/0204474 A1 * | 10/2003 | Capek et al. | 705/64 |
| 2004/0039626 A1 | 2/2004 | Voorhees | |
| 2004/0044556 A1 * | 3/2004 | Brady et al. | 705/8 |
| 2004/0061567 A1 | 4/2004 | Doss et al. | |
| 2004/0064585 A1 | 4/2004 | Doss et al. | |
| 2004/0088362 A1 | 5/2004 | Curbow et al. | |

OTHER PUBLICATIONS

Kincaid, C.M. et al, "Electronic Calendars in the Office: An Assessment of User Needs and Current Technology,"ACM Transactions on Office Information Systems, vol. 3., No. 1, Jan. 1985, pp. 89-102.

(Continued)

*Primary Examiner* — Romain Jeanty
(74) *Attorney, Agent, or Firm* — A. Bruce Clay

(57) ABSTRACT

Method, apparatus, and computer program products for estimating, scheduling, and tracking preparatory work associated with electronic meeting invitations. When a meeting invitation is received and tentatively accepted, preparation time for associated work is estimated programmatically from characteristics of documents associated with the meeting invitation. A floating block of time is created, subject to the constraint that it must be completed before the meeting convenes, and added to the user's electronic calendar.

18 Claims, 3 Drawing Sheets

OTHER PUBLICATIONS

Blandford, A.E. et al, "Group and Individual Time Management Tools: What You Get is Not What You Need," Springer-Verlag London Ltd, Personal Ubiquitous Computing (2001), 5:213-230.

Beard, D. et al, "A Visual Calendar for Scheduling Group Meetings," Department of Computer Science, University of North Carolina Chapel Hill, NC 27599, CSCW Oct. 1990, pp. 279-290.

* cited by examiner

US 7,925,528 B2

ESTIMATING AND SCHEDULING ADDITIONAL CALENDAR TIME IN PREPARATION FOR ELECTRONICALLY CALLED MEETINGS

RELATED APPLICATION

Attention is called to commonly assigned U.S. patent application Ser. No. 10/845,964, "Accommodating preparatory work for electronically scheduled meetings," which is now pending.

FIELD OF THE INVENTION

The invention relates to the field of productivity aides such as personal organizers and personal computers that provide electronic calendars and to-do lists.

BACKGROUND

Tracking and organizing a personal schedule has become an important and sometimes intractable problem for professional level workers in modern economies. Tasks in today's workplace arrive in the form of electronic meeting invitations, to-do items, personal appointments, notes from management and colleagues, and so forth. In response, personal organizational tools such as Lotus® Notes® and Microsoft® Outlook have arisen.

Although these tools are quite useful and helpful, they present a number of disjointed views of the workday. For example, such a tool may have an electronic calendar for appointments and meetings, and a to-do list for work items that need to be completed by specified dates. The separateness of these views makes keeping track of overall work commitment problematic.

A problem frequently arises when meetings are called and scheduled electronically, in that a meeting requires not only its scheduled time, but may also require time for preparatory work that must be completed before the meeting convenes. Such preparatory time is not accounted for by the user's calendar or to-do list when meetings are scheduled electronically.

This omission may result in meetings that have attendees who overbook their days and are therefore unable to prepare adequately, or to overstressed attendees who work long into the night preparing for meetings at the last minute without adequate notice from their personal organizational tools. Thus, there is a need for improved personal organizational tools that estimate, track, and schedule work commitments that are implicitly or explicitly associated with electronic meeting invitations, but which are not accounted for by today's productivity aids.

SUMMARY

The present invention provides a way of estimating, scheduling, and tracking preparatory work that is associated with electronic meeting invitations. The associated preparatory work often takes the form of to-do items that require blocks of time for their completions before the meetings begin, such as reviewing documents of various kinds.

According to the invention, a user's calendar and to-do list may be coordinated so as to keep track of associated work that arises from electronically called meetings. When a meeting invitation is received and tentatively accepted, the expected preparation time for any associated work is estimated programmatically using information known about documents associated with the invitation, without requiring input from the user. A floating block of time for completing the preparatory work is then created, subject to the constraint that the preparatory work must be completed before the meeting begins. If both the meeting and the associated floating block of time can be scheduled without irresolvable conflicts with other commitments already scheduled, the meeting and the associated floating block of time are added to the user's calendar, and, in some embodiments of the invention, a to-do associated with the floating block is added to the user's to-do list. Herein, the concepts of "calendars" and "to-do" lists are to be read broadly to include workflow systems and other task-based and activity-based systems. Collectively, these are called "calendars" and "to-do lists" below, for descriptive convenience.

DETAILED DESCRIPTION

Figure 1:
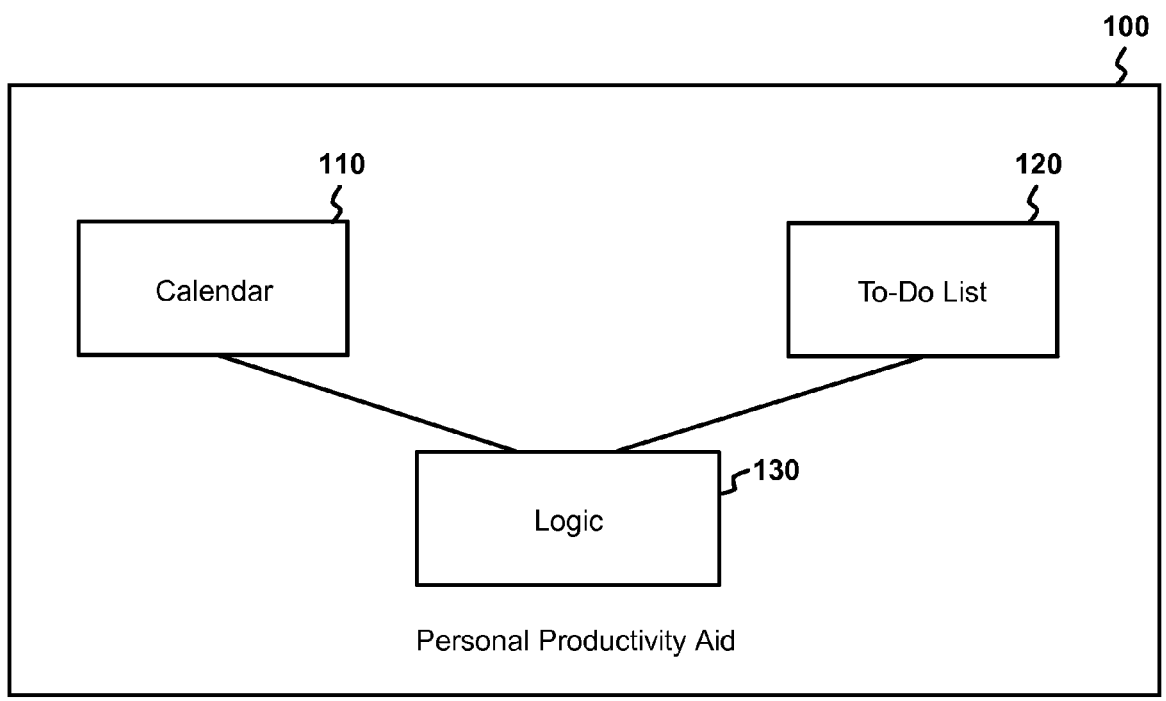
FIG. 1 shows a personal productivity aid having an electronic calendar and a to-do list that operate in concert.

The present invention will now be described more fully hereinafter, with reference to the accompanying drawings, in which illustrative embodiments of the invention are shown. Throughout the drawings, like numbers refer to like elements.

The invention may, however, be embodied in many different forms, and should not be construed as limited to the embodiments set forth herein; rather, these embodiments are provided so that the disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an embodiment entirely in hardware, entirely in software, or in a combination of aspects in hardware and software referred to as circuits and modules.

Furthermore, the present invention may take the form of a computer program product on a computer-usable storage medium having computer-usable program code embodied in the medium. Any suitable computer-readable medium may be utilized, including hard disks, CD-ROMs, optical storage devices, magnetic storage devices, and transmission media such as those supporting the Internet or an intranet.

Computer program code for carrying out operations of the present invention may be written in an object oriented programming language such as Java7, Smalltalk, or C++. However, the computer program code for carrying out operations of the present invention may also be written in conventional procedural programming languages, such as the C programming language. The program code may execute entirely on the user's computer, partly on the user's computer, as a stand-alone software package, partly on the user's computer and partly on a remote computer, or entirely on a remote computer. The remote computer may be connected to the user's computer through a local area network or a wide area network, or the connection may be made to an external computer, for example through the Internet using an Internet Service Provider.

The present invention is described below with reference to flowchart illustrations and/or block diagrams of methods, apparatus (systems), and computer program products according to embodiments of the invention. It will be understood that each block of the flowchart illustrations and/or block diagrams can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions and/or acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the functions or acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions and/or acts specified in the flowchart and/or block diagram block or blocks.

The present invention includes methods, apparatus, and computer program products for estimating, scheduling, and tracking preparatory work that is implicitly or explicitly associated with electronic meeting invitations. The associated work often takes the form of to-do items that require blocks of time for their completions before the meetings, such as reviewing documents of various kinds. According to the invention, a user's calendar and to-do list may be coordinated so as to keep track of such preparatory work that arises from electronically called meetings.

FIG. 1 shows a personal productivity aid 100 having an electronic calendar 110 and to-do list 120 that operate together under the direction of logic 130 according to a method that is explained below with reference to FIG. 2. Here, the electronic calendar 110 and to-do list 120 may be implemented by software, firmware, microcode, and the like for a programmable processor which serves as the logic 130, along with memory. The processor and memory may be part of a personal computer, a hand-held personal organizer, a web server or client, and so forth.

When an electronic meeting invitation is received and tentatively accepted, the expected preparation time for any associated work is estimated programmatically, without requiring input from the user. This estimate may be computed by examining documentation attached to or otherwise associated with the meeting invitation, for example by links. To do so, the document type of each associated document is determined, for example by determining its file-type designation. Document types may include word processing text, presentation slides, spreadsheets, PDF files, and the like. Based on each document type, and on the length of each associated document, the estimated preparation time is computed. In a preferred embodiment of the invention, default preparation times are one minute for each 250 words of text; one minute for each drawing, figure, and PDF file; and one minute for each spreadsheet line. The user may be allowed or prompted to change these values. Thus, for example, a meeting invitation having two attached documents, one being a 5000 word text file with ten drawings, and the second being a 30-line spreadsheet, would have an estimated preparation time of 20 minutes for the text, 10 minutes for the drawings, and 30 minutes for the spreadsheet, giving a total estimated preparation time of 60 minutes.

In another preferred embodiment of the invention, the expected preparation time may be estimated using a document category such as whether the document is a white paper as opposed to a conceptual design document. Gradations of such an indicator may be found by, for example, examining the linguistic complexity of the document using a technique such as the well-known "Flesch index." The Flesch index gives a numerical factor that corresponds to the reading level needed to understand the content of the document. This numerical factor may be applied to default or otherwise-computed preparation times.

In other preferred embodiments, the expected preparation time may be estimated using the identity of the document's author or first-listed author. For example, the author's name may be assigned an organizational importance level so that, for example, a document written by an executive manager may be assigned more preparation time than a document from an entry-level worker. In other situations, preparation time may be estimated using contact information associated with the author's name, so that familiar work may be assigned less preparation time than unfamiliar work. Also, preparation time maybe estimated using a revision level of the document, so that a first encounter with a document may be assigned more preparation time than a final review of a minor update.

In some embodiments of the invention, provision may be made for considering a user profile, so that, for example, a user may select a multiplier to be applied to default or otherwise-computed estimates of preparation time. According to the profile, lead time may also be considered, so that a user who likes to prepare immediately before a meeting will be accommodated to the extent possible, as may a user who prefers a long lead time for preparation before the associated meeting.

A floating block of calendar time is then created, with a length equal to the estimated preparation time, subject to the constraint that the block's ending time must occur before the time that the meeting is scheduled to convene. If both the meeting and the associated floating block can be scheduled without irresolvable conflicts, the meeting and the associated floating block of time are added to the user's calendar 110. A to-do item associated with the floating block may be added to the user's to-do list 120. When an invitation for a second meeting conflicts with a first floating block associated with a first meeting, the first floating block may be rescheduled, if possible within its completion-time constraint, to accommodate the second meeting. Blocks of preparation time may be split. For example, a one-hour block may be split into two thirty-minute blocks, the preparation time may be split according to the number of documents or the length of the documents, and so forth.

Figure 2A:
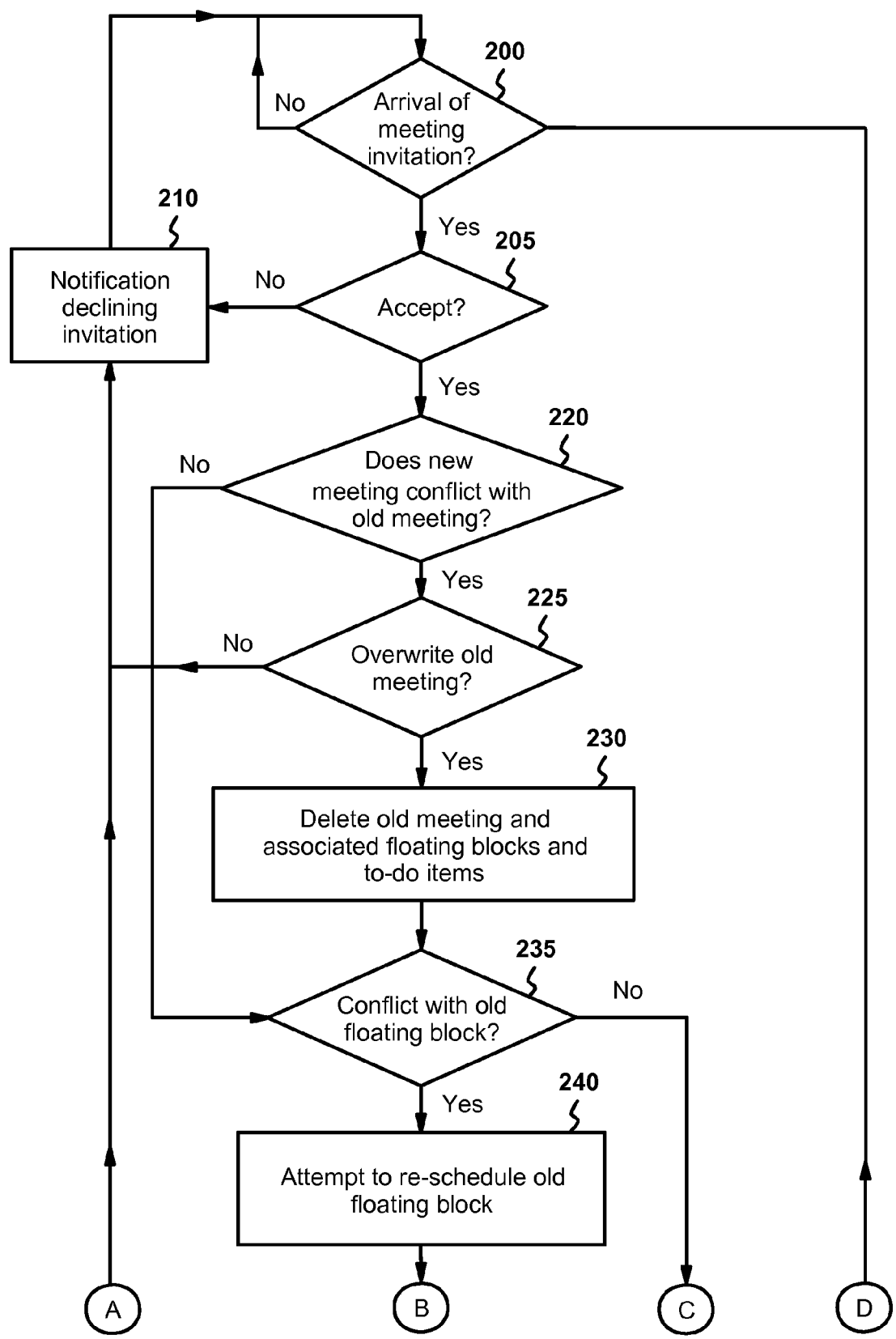
FIGS. 2A and 2B together show an exemplary method for operating the calendar and to-do list of FIG. 1.
Figure 2B:
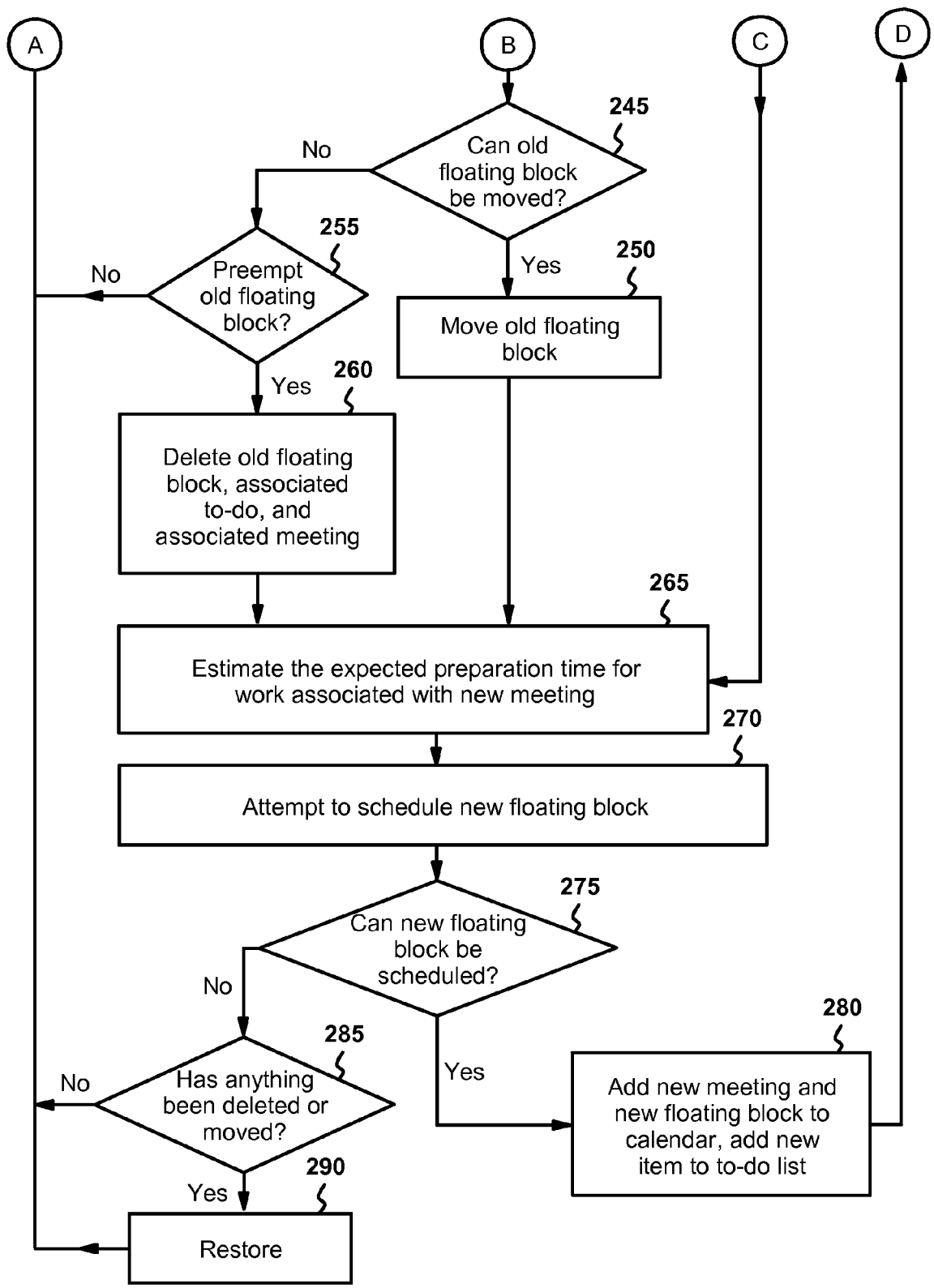

As shown in FIGS. 2A and 2B, the arrival of an incoming electronic meeting invitation is awaited (step 200). Upon the arrival of an invitation, the user is prompted as to whether he or she wishes to accept the invitation tentatively (step 205). If the user does not accept the invitation, i.e., declines, a notification declining the invitation may be sent to the originator of the incoming electronic meeting invitation (step 210). Status then returns to step 200 to await the arrival of the next incoming meeting invitation.

Otherwise (i.e., the user tentatively accepts the invitation), a determination is made as to whether the new meeting conflicts with a meeting already scheduled, which is called here an old meeting (step 220). If the new meeting conflicts with an old meeting, the user is prompted to determine whether he or she would like to overwrite the old meeting with the new meeting on the calendar (step 225). If not, a notification declining the invitation may be sent (step 210), and status returns to await the arrival of another incoming meeting invitation (step 200). If the user would like for the new meeting to overwrite the old, the old meeting and any associated floating blocks of time are deleted from the calendar, and any to-do items associated with the old meeting are deleted from the to-do list (step 230).

Upon completion of step 230, or if the result of step 220 does not indicate a conflict between the new meeting and an old meeting, a determination is made as to whether the new meeting conflicts with any floating block of time already scheduled for another meeting (step 235). If there is a conflict, an attempt is made to free space for the new meeting by rescheduling the floating block that is in conflict with the new meeting, which is now called the old floating block (step 240). In one embodiment of the invention, rescheduling may be done by looking for an open time in the calendar that is consistent with the duration and due-time of the old floating block. The user may impose constraints on the rescheduling of the old floating block. For example, the user may prohibit its movement to times outside predetermined working hours.

Thus, based on the outcome of the scheduling attempt of step 240, a determination is made as to whether or not the old floating block can be moved (step 245). If the old floating block can be moved, the old floating block is moved on the user's calendar, and the to-do list is adjusted accordingly (step 250). If the determination in step 245 is that the old floating block cannot be moved, the user is queried to determine whether he or she would like to preempt the old floating block (step 255). If the user declines to preempt the old floating block, the invitation to the new meeting cannot be accepted, and a notification declining the invitation may be sent (step 210). If the user decides to preempt the old floating block, the old floating block is deleted from the user's calendar, any associated to-do item is deleted from the user's to-do list, and the meeting associated with the old floating block is deleted from the user's calendar (step 260).

After deleting the old floating block in step 260, or moving the old floating block in step 250, or if the determination in step 235 is that the new meeting does not conflict with any of the floating blocks, the expected preparation time for work associated with the new meeting is computed (step 265) as described above. A floating block and to-do item are created in association with the new meeting, which are called here the new floating block and the new to-do item. The estimated preparation time is used as the length of the new floating block.

An attempt is then made to schedule the new floating block (step 270). In one embodiment of the invention, scheduling is done by looking for an open time in the calendar that is consistent with the due-time and length of the new floating block. Again, the user may put constraints on the scheduling process, prohibiting, for example, scheduling the new floating block outside normal working hours.

Based on the outcome of the scheduling attempt, a determination is made as to whether the new floating block can be scheduled (step 275). If the new floating block can be scheduled, the new meeting and the new floating block are added to the calendar, and a new to-do item associated with the new floating block is added to the to-do list (step 280). Status then returns to await the arrival of another meeting invitation (step 200). If the new floating block cannot be scheduled, neither the new meeting nor the associated to-do item can be accepted. In this case, a determination is made as to whether an old meeting and associated old floating block or to-do item were deleted in step 230 or step 260, or an old floating block moved in step 250 (step 285). If so, the old meeting, floating block, or to-do item is restored (step 290), and a notification declining the invitation may be sent (step 210). Otherwise (i.e., nothing has been deleted or moved), nothing needs to be restored; a notification declining the invitation may be sent (step 210).

A preferred embodiment of the invention has been described. This embodiment is illustrative of the invention, however, rather than limiting. For example, the use of simple scheduling algorithms have been described with reference to step 240 and step 270. These algorithms have the advantage of simplicity and low complexity, in that they do not move more than one old floating block when attempting to schedule a new floating block. However, the scope of the invention encompasses all scheduling algorithms, not just the simple exemplary algorithms described above. Such algorithms may be, for example, single-capacity bin-packing algorithms that move a plurality of floating blocks in an attempt to schedule efficiently. Numerous examples of such algorithms are known to those skilled in the arts of computer science and operations research.

Although the foregoing has described methods, apparatus, and computer program products for enhancing personal productivity, the description is illustrative of the invention rather than limiting, and the invention is limited only by the claims that follow.

We claim:

1. A method for accommodating time needed by an invitee for preparatory work associated with a meeting scheduled by an electronic meeting invitation in an electronic calendaring hardware system, comprising:
   receiving, by the electronic calendaring hardware system, an electronic invitation to a meeting, the invitation comprising a first document;
   receiving at least a second document associated with the meeting, wherein said at least a second document contains material needed by the invitee to prepare for the meeting;
   programmatically estimating time needed by the invitee to accomplish work associated with the meeting, in order to allow preparation of the invitee for attendance at and participation, if any, in the meeting;
   associating a floating block of time with the meeting, said floating block of time corresponding to the preparation time needed by the invitee using the estimated preparation time as a length of said floating block of time, to account for the associated work by the invitee; and
   adding the floating block and the meeting to invitee's electronic calendaring hardware.

2. The method of claim 1, wherein estimating the preparation time comprises determining a document type of said at least a second document associated with the meeting and computing the preparation time based on the document type of said at least a second document.

3. The method of claim 1, wherein estimating the preparation time comprises determining a length of said at least a second document associated with the meeting and computing the preparation time based on said length of said at least a second document.

4. The method of claim 1, wherein estimating the preparation time comprises determining a complexity of said at least a second document associated with the meeting and computing the preparation time based on said complexity.

5. The method of claim 1, wherein estimating the preparation time comprises determining an identity of an author of said at least a second document associated with the meeting and computing the preparation time based on said identity.

6. The method of claim 1, wherein estimating the preparation time comprises determining a revision level of said at least a second document associated with the meeting and computing the preparation time based on said revision level.

7. A computer program product to accommodate time needed by an invitee for preparatory work associated with a meeting scheduled by an electronic meeting invitation, the computer program product comprising a non-transitory computer readable storage medium having computer readable program code embodied therewith, the computer readable program code comprising:

computer readable program code configured to receive an electronic invitation to a meeting the invitation com risin a first document;

computer readable program code configured to receive at least a second document associated with the meeting, wherein said at least a second document contains material needed by the invitee to prepare for the meeting;

computer readable program code configured to estimate time needed by the invitee to accomplish work associated with the meeting, in order to allow preparation of the invitee for attendance at and participation, if any, in the meeting;

computer readable program code configured to associate a floating block of time with the meeting, said floating block of time corresponding to the preparation time needed by the invitee, using the preparation time as a length of said floating block of time; and computer readable program code configured to add said floating block and the meeting to the invitee's electronic calendar.

8. The computer program product of claim 7, wherein the computer readable program code configured to estimate the preparation time comprises computer readable program code configured to determine a document type of said at least a second document associated with the meeting and to compute the preparation time based on said document type of said at least a second document.

9. The computer program product of claim 7, wherein the computer readable program code configured to estimate a preparation time comprises computer readable program code configured to determine a length of said at least a second document associated with the meeting and to compute the preparation time based on said length of said at least a second document.

10. The computer program product of claim 7, wherein the computer readable program code configured to estimate a preparation time comprises computer readable program code configured to determine a complexity of said at least a second document associated with the meeting and to compute the preparation time based on said complexity.

11. The computer program product of claim 7, wherein the computer readable program code configured to estimate a preparation time comprises computer readable program code configured to determine an identity of an author of said at least a second document associated with the meeting and to compute the preparation time based on said identity.

12. The computer program product of claim 7, wherein the computer readable program code configured to estimate a preparation time comprises computer readable program code configured to determine a revision level of said at least a second document associated with the meeting and to compute the preparation time based on said revision level.

13. An electronic calendaring hardware system for accommodating time needed by an invitee for preparatory work associated with a meeting scheduled by an electronic meeting invitation, comprising:

a processor configured for:

recording times of meetings on an electronic calendar;

receiving an electronic invitation to a meeting, the invitation comprising a first document;

receiving at least a second document associated with the meeting, wherein said at least a second document contains material needed by the invitee to prepare for the meeting;

estimating time needed by the invitee to accomplish work associated with the meeting, in order to allow preparation of the invitee for attendance at and participation, if any, in the meeting;

associating a floating block of time with the meeting, said floating block of time corresponding to the preparation time needed by the invitee, using the preparation time as a length of said floating block of time; and adding said floating block of time and the meeting to the invitee's electronic calendar.

14. The system of claim 13, wherein said estimating the preparation time comprises determining a document type of said at least a second document associated with the meeting and computing the preparation time based on the document type of said at least a second document.

15. The apparatus of claim 13, wherein said estimating a preparation time comprises logic for determining a document length of said at least a second document associated with the meeting and computing the preparation time based on said length of said at least a second document.

16. The apparatus of claim 13, wherein estimating the preparation time comprises determining a complexity of said at least a second document associated with the meeting and computing the preparation time based on said complexity.

17. The apparatus of claim 13, wherein estimating a preparation time comprises determining an identity of an author of said at least a second document associated with the meeting and computing the preparation time based on said identity.

18. The apparatus of claim 13, wherein estimating the preparation time comprises determining a revision level of said at least a second document associated with the meeting and computing the preparation time based on said revision level.

* * * * *